June 4, 1957 P. M. G. HECKERMAN 2,794,498
FLEXIBLE SHUTTER TYPE DOOR AND WINDOW AWNING
Filed Nov. 4, 1953 6 Sheets-Sheet 1

Pearl M.G. Heckerman
INVENTOR.

Pearl M. G. Heckerman
INVENTOR.

June 4, 1957 P. M. G. HECKERMAN 2,794,498
FLEXIBLE SHUTTER TYPE DOOR AND WINDOW AWNING
Filed Nov. 4, 1953 6 Sheets-Sheet 4

Pearl M. G. Heckerman
INVENTOR.

June 4, 1957 P. M. G. HECKERMAN 2,794,498
FLEXIBLE SHUTTER TYPE DOOR AND WINDOW AWNING
Filed Nov. 4, 1953 6 Sheets-Sheet 5

Pearl M. G. Heckerman
INVENTOR.

June 4, 1957     P. M. G. HECKERMAN     2,794,498
FLEXIBLE SHUTTER TYPE DOOR AND WINDOW AWNING
Filed Nov. 4, 1953     6 Sheets-Sheet 6

Pearl M. G. Heckerman
INVENTOR.

United States Patent Office 2,794,498
Patented June 4, 1957

2,794,498

FLEXIBLE SHUTTER TYPE DOOR AND WINDOW AWNING

Pearl M. G. Heckerman, Jefferson City, Mo.

Application November 4, 1953, Serial No. 390,171

9 Claims. (Cl. 160—62)

This invention comprises novel and useful improvements in a flexible shutter type door and window awning, and more specifically pertains to a novel and advantageous awning of the plural slat type having improved telescoping supporting and bracing means for the same.

The primary object of this invention is to provide an improved collapsible flexible shutter type door and window awning.

A further object of the invention is to provide an improved awning of the collapsible type which can be readily collapsed and stored under a conventional storm cap or hood over a window opening.

A still further object of the invention is to provide an improved collapsible awning having improved means for securing a plurality of awning slats to collapsible support members.

Yet another object of the invention is to provide an awning of the character above set forth and wherein improved means are provided for pivotally securing the slats to the supporting means.

Yet another object of the invention is to provide an awning of the collapsible type having improved means for limiting the expansion or extension of the awning.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

In general, the principles and improvements of the present invention relate to partitions comprising a plurality of slats which are so associated with each other that they may be selectively extended to form a partition or collapsed into a compact space for convenience in storing; and more specifically pertain to telescoping supports and braces for such partitions to enable the latter to serve as awnings, window shutters, window shades, slidable doors and the like.

The accompanying drawings illustrate the adaptation of the fundamental principles of this invention in a variety of manners, showing different usages for the novel telescoping partition, and various modified forms of telescoping supports for the same and for means whereby the slats are attached to the supports and braces.

*Ventilated awning construction of Figures 1–4*

Reference is now made first to Figures 1–4 for one suitable manner in which the basic principles of this invention are utilized. In this embodiment, it will be seen that the novel collapsible partition indicated generally by the numeral 10 is mounted to serve as a collapsible ventilated awning for a window structure or other opening in a building wall, indicated by the numeral 12. In this embodiment, it will be seen that there is provided a substantially horizontal panel 14 constituting a storm cap or storm shield for the awning and which may conveniently comprise a single strip of sheet material having a vertical flange 16 which is apertured to receive a plurality of fastening screws 18 whereby the storm cap may be mounted above the window structure 12. At its outer end, it will be seen that the storm cap is provided with a depressed trough-like gutter portion 20 whereby precipitation striking the storm cap will be discharged from the opposite sides of the same.

A pair of L-shaped end members, each indicated generally by the numeral 22, is provided having vertical legs 24 which are adapted to be secured to the vertical face of the window structure 12 and at their upper ends having integral horizontal legs 26 which are adapted to underlie and support the storm cap 14. The end members 22 are preferably constructed in the form of a channel member, as will be readily apparent from Figures 1 and 2.

Figures 1, 2:
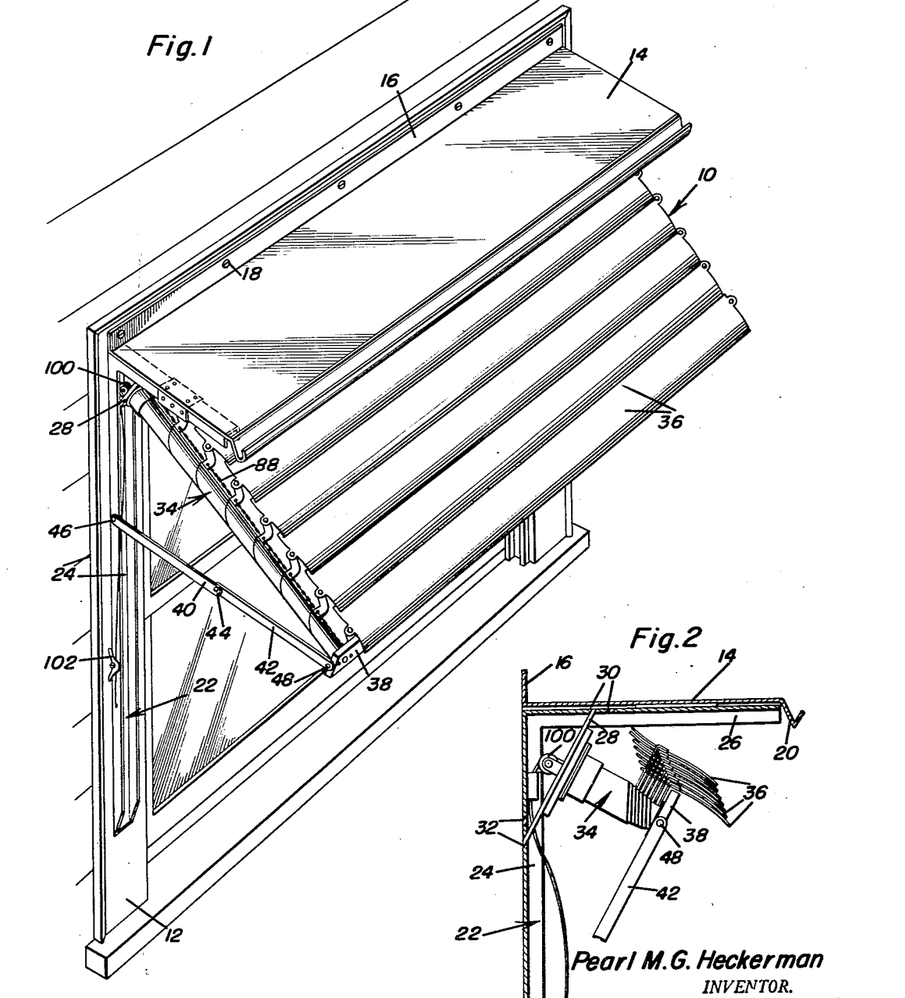
Figure 1 is a perspective view of a first embodiment of collapsible telescoping awning in accordance with this invention, the same being shown in its extended position and having spiral telescoping support and brace means for the awning.
Figure 2 is an end elevational view, parts being shown in vertical transverse section, showing the awning of Figure 1 in its collapsed position and compactly disposed beneath the storm cap of the awning.

Adjacent the junction of the vertical and horizontal legs 24 and 26 of the end members 22, there are provided plates 28 which are angularly adjustable by being selectively positioned in one of a plurality of slots 30 in the horizontal member 26 and 32 in the vertical member 24, as will be apparent from Figure 2. The plates 28 serve as bases upon which are fixedly secured and supported telescoping supports or braces indicated generally by the numeral 34 and by means of which the partition member 10 constituting the ventilated metal awning is supported.

The structure of the telescoping supports 34 of this embodiment of the invention is illustrated more particularly in Figure 3 and will be referred to hereinafter. These supports carry a plurality of slats 36 which are selectively extended and collapsed as shown in Figures 1 and 2, respectively, to provide the awning structure. At their outer ends, the supports 34 are fixedly attached to a bottom rail 38 and a folding hinged brace consisting of a pair of links 40 and 42, hinged to each other, as at 44, are provided, the links 40 and 42 being respectively pivoted as at 46 to the vertical member 24 and at 48 to the end of the member 38. By means of this construction, when the telescoping support 34 is in its extended position, as shown in Figure 1, the hinged brace will likewise be extended, as shown in Figure 1, and the awning will be in its expanded position. However, when the brace is folded and the telescoping member is collapsed, the slats of the awning will be telescoped upon each other, the support rods 34 will be collapsed, and the entire awning assembly will be disposed below and in a manner covered and protected by the storm cap or shield 14, as shown in Figure 2.

Figures 3, 4:
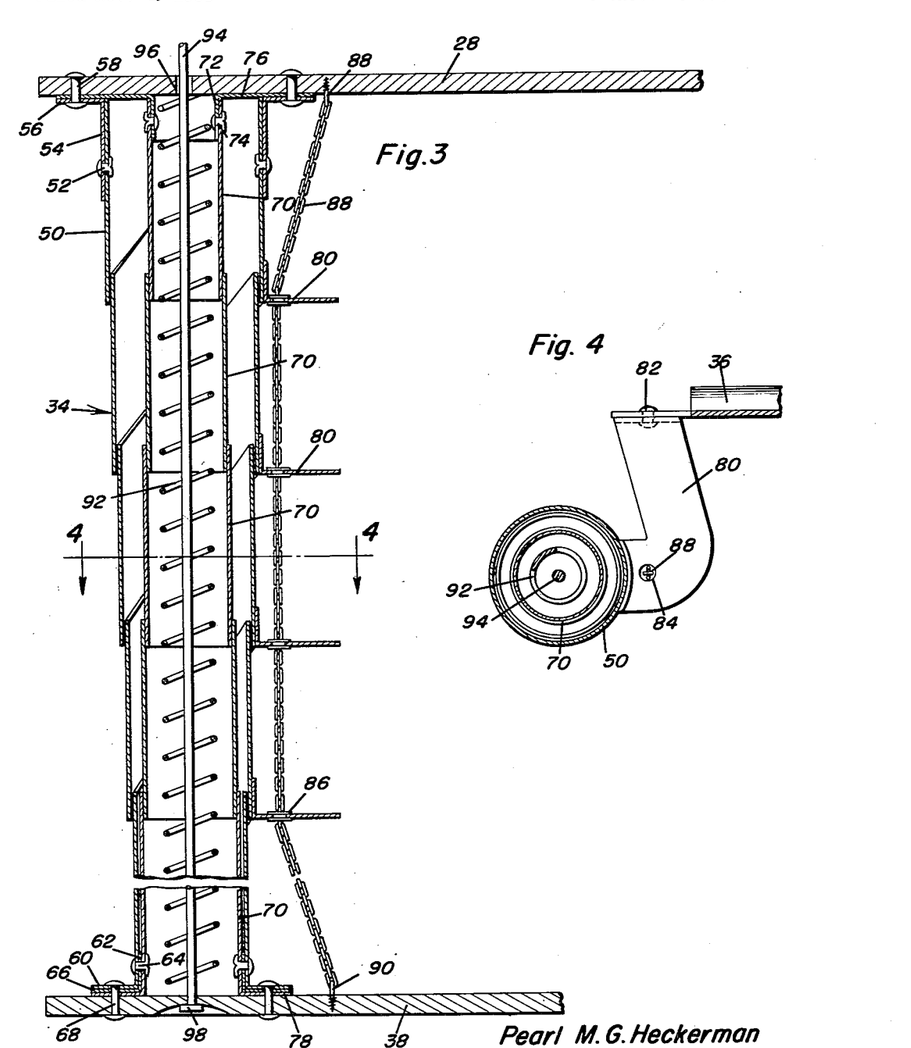
Figure 3 is an enlarged view taken in vertical central section through a portion of the awning and showing in particular the construction of the spiral telescoping support member and an expansion limiting means for the same, this being the construction employed in the embodiment of Figure 1.
Figure 4 is a horizontal sectional detail view taken substantially upon the plane indicated by the section line 4—4 of Figure 3 and showing the manner in which a slat of the awning is secured to the spiral telescoping support member.

Reference is now made more particularly to Figure 3 for an understanding of the specific construction of the telescoping support 34. As shown in this figure, it will be seen that the telescoping support consists of a steel spiral 50 of suitable resilient spring steel construction, having its largest convolution received inside and secured, as by means of rivets or other fasteners 52, to the cylindrical wall of a collar 54 having an annular out-turned flange 56 secured as by fasteners 58 to the above mentioned base plate 28. It will thus be seen that what may be termed the base end of the spiral coil constituting the telescoping support 34 is anchored to the plate 28. The smaller and what may be termed the outer end of the spiral coil is provided with an out-turned flange 60. A reinforcing or stiffening collar 62 is provided inside the outer end of the spiral coil, being secured thereto as by a fastener 64 in the form of a rivet or the like; this collar having an out-turned flange 66 which underlies the flange 60. Fasteners 68 secure the flanges 60 and 66 to the bottom rail 38 previously mentioned.

There is also provided a telescoping guide or stiffener for the spiral coil constituting the telescoping support. This guide consists of a plurality of concentric nested slidable cylindrical sleeves, there preferably being the same number of these sleeves as there are convolutions of the spiral coil 50. These sleeves, each indicated by the numeral 70, are disposed within the coil and axially thereof. The sleeve 70 which is adjacent the base plate 28, is telescopingly engaged over a collar 72, and is fixedly secured to the cylindrical neck of this collar, as by rivets or the like 74. This collar is provided with a laterally extending flange 76 which lies between the previously mentioned flange 56 of the telescoping support 50 and the base plate 28, being secured to these members by the above mentioned fasteners 58.

At its outer extremity, the telescoping guide has its outermost sleeve 70 provided with an out-turned lateral flange 78 which lies between the flanges 60, 66 and the bottom rail 38, being secured thereto by the above mentioned fasteners 68. The outermost sleeve 70 likewise lies within the collar 62, being secured thereto and to the outermost convolution of the spiral 50 by the above mentioned fastener 64.

It will thus be apparent that the telescoping guide and the telescoping spiral may be expanded or collapsed simultaneously, and will support and carry with them in this expanding or collapsing movement the bottom rail 38.

Secured to each of the convolutions of the telescoping spiral 50, as by welding or any other suitable manner, are a plurality of support brackets 80 to which are secured, as by rivets 82, the above mentioned slats 36. The brackets 80 are provided with apertures 84 through which extend suitable bushings, eyelets or the like 86 and a chain 88 or other similar member is threaded through these apertures, being secured at its opposite ends, as by screws 88 and 90, to the above mentioned base plate 28 and the bottom rail 38. This chain serves as a stop to limit the expanding movement of the awning and the expanding movement of the telescoping guide 70 and the spring spiral 50 which constitute the telescoping support 34.

Disposed within the telescoping guide is a compression spring 92 which at its opposite extremities bears against the base plate 28 and the bottom rail 38 to urge these members apart and thereby resiliently urge the telescoping support into its expanded position whereby the articulated partition member 10 will be urged into its operative position as an awning.

In order to collapse the awning, there is provided a flexible cable 94 which extends through an aperture 96 in the base plate 28, extends through the telescoping guide 50 and the compression spring 92 to the bottom rail 38 and through the latter, being provided with an enlarged head 98 as shown in Figure 3. As will be better apparent from Figures 1 and 2, the flexible cable 94 after its emergence through the aperture 96 in the base plate 28, is entrained over a guide pulley 100 and passing downwardly through the vertical channel member 24 of the end member 22, may be secured to a cleat 102. By this means, the awning may be selectively collapsed into the position shown in Figure 2; or the cable may be released, permitting the spring 92 to expand the awning into its operative position as shown in Figure 1.

As will be evident from a comparison of Figures 1 and 2, in conjunction with Figure 4, the mounting brackets 80 by which the slats 36 are attached to the telescoping support 34 are of graduated, progressively increasing size from one end of the telescoping support whereby when the support is collapsed, the series of slats may be substantially nested above each other and above the end of the telescoping support, in the manner shown in Figure 2.

The slats themselves in cross-section are preferably of a flattened S-shape, having their upper edges of their top surfaces concaved and their lower edges of their top surfaces being convexed, as will be apparent from Figure 2. By this construction, moisture dropping from the convex edge of an upper slat will drop down upon the concave surface of the next lower slat, and thus will be shed from the lower end of the awning. By this construction, there is thus provided a small but definite air space between the convex lower edge of an upper slat and the concave upper edge of the next slat therebeneath, thus providing an air space for ventilation between these members.

Figure 5:
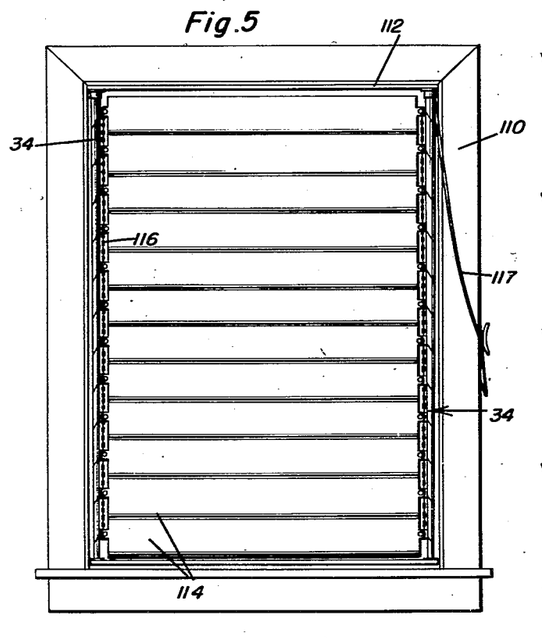
Figure 5 is a front elevational view of a second embodiment of the invention, the awning being shown in the form of a vertically moving shade or shutter for a window, and in its extended position.
Figure 6:
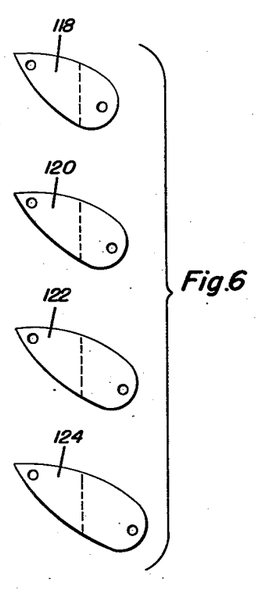
Figure 6 is a composite diagrammatic view illustrating successive mounting brackets by which the slats of the awning are secured to the telescoping support member of the same.

*Shutter construction of Figures 5 and 6*

The same construction of telescoping support and a partition consisting of a plurality of collapsible slats may be utilized to provide a vertically moving slidable window shutter. For this purpose, the window frame construction indicated at 110 is provided with a pair of telescoping supports 34 of the construction previously described and shown in detail in Figure 3, these supports being fitted in the window opening, at the opposite sides of the same, with the enlarged end of the telescoping supports 34 being secured to the horizontal surface of a base plate 112 mounted within the window opening and serving the same functions as the base plate 28.

As in the preceding embodiment, a plurality of slots 114 are secured to the telescoping support 34 and a stop means in the form of a chain 116 corresponding to the chain 88 previously described is provided. The cable 117 corresponding to the cable 94 provides means whereby the telescoping supports 34 including their telescoping guides (not shown) may be collapsed, whereby the shutter will be raised against the resistance of the return spring (not shown) but of the same construction as the spring 92 of Figure 3.

As in the embodiment of Figures 1–4, a plurality of brackets are provided whereby the slats 114 may be secured to the convolutions of the spiral spring forming the outer member of the telescoping support 34. These brackets, as shown in Fig. 6, are of progressively increasing size, as shown at 118, 120, 122, and 124, whereby clearance is provided to permit the brackets and the slats to be collapsed into a nested and retracted position, in the manner shown in Figure 2 of the embodiment of Figures 1–4.

In this embodiment, it will be seen that the same principles as to the telescoping support and the plurality of slats mounted upon the convolutions of the support may be utilized to provide an articulated panel which may be selectively expanded to comprise a closure or cover for a relatively large area and, alternatively, collapsed into a small space for storage, being utilized in the embodiment of Figure 5 as a shutter or window closure.

Figure 7:
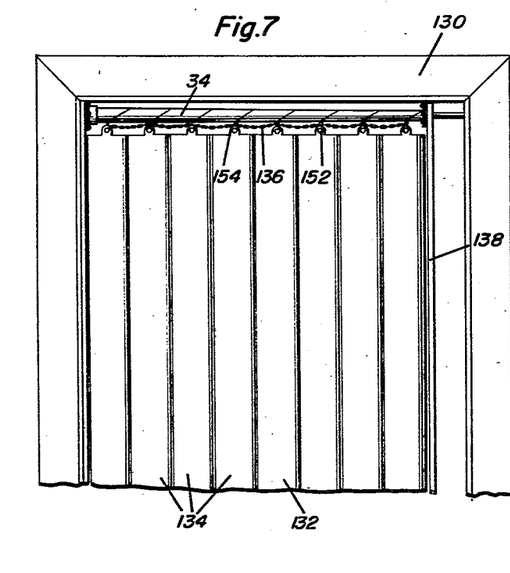
Figure 7 is a fragmentary view in elevation of a third embodiment of the invention and showing the invention applied as a horizontally sliding closure for a doorway or the like, the closure being shown in its nearly fully extended position.
Figure 8:
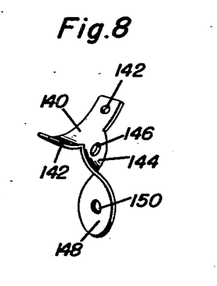
Figure 8 is a perspective view of a bracket by means of which the panels or slats of Figure 7 are secured to the telescoping supporting member of the closure.

*Embodiment of Figures 7 and 8 wherein the partition is utilized as a horizontally slidable partition or door*

In the two embodiments of Figures 1–4 and Figures 5 and 6, the articulated partition is illustrated as being mounted for vertical movement to function as a window awning or as a window shutter or closure. The articulated partition can also be mounted for horizontal sliding movement whereby the same will function as a partition or a room or a closure for a door of the same. Thus, as shown in Figure 7, the upper portion of a door frame is indicated at 130 and the articulated partition is indicated by the numeral 132. The latter, as in the preceding embodiments, includes a plurality of slats 134 which, however, are disposed with their axis in parallel relation in a vertical plane, being secured at their upper ends to a horizontally disposed telescoping support 34 of the construction previously described. This support also may include a limit chain 136 corresponding to the previously described chain 88 and the previously described compression spring and control cable may be provided, if desired. It is, however, possible in this embodiment to omit the control cable completely, and permit the compression spring to yieldingly expand the partition member to close the door opening 130; or both the spring and chain may be omitted, whereby the end rail 138 of the partition 132 functioning as a door and which end member constitutes an equivalent of the bottom rail 38, may be grasped to slide the partition towards the right or left to close or open the doorway as desired. It will be understood that the lower ends of the panels 132 may be secured to another one of the support members 34, if desired; or, may be merely mounted in guides, if desired.

A slightly different form of support bracket may be employed for securing the panels to the horizontally disposed telescoping supports 34 in the embodiment of Figure 7, if desired. Such modified support bracket, as shown in Figure 8, includes an arcuate strip 140 which is apertured, as at 142 at its ends, for attachment to the convolutions of the spiral outer member of the tubular support 34. From the member 140 extends downwardly a flat portion 144 which is apertured, as at 146, for the reception of the stop chain 136. Finally, from the portion 144, there depends a vertical portion 148, disposed at right angles to the portion 144, and apertured as at 150, for the reception of fasteners 152 whereby lugs 154 of the slats 132 may be secured to the brackets.

Figures 9, 10, 11, 12:
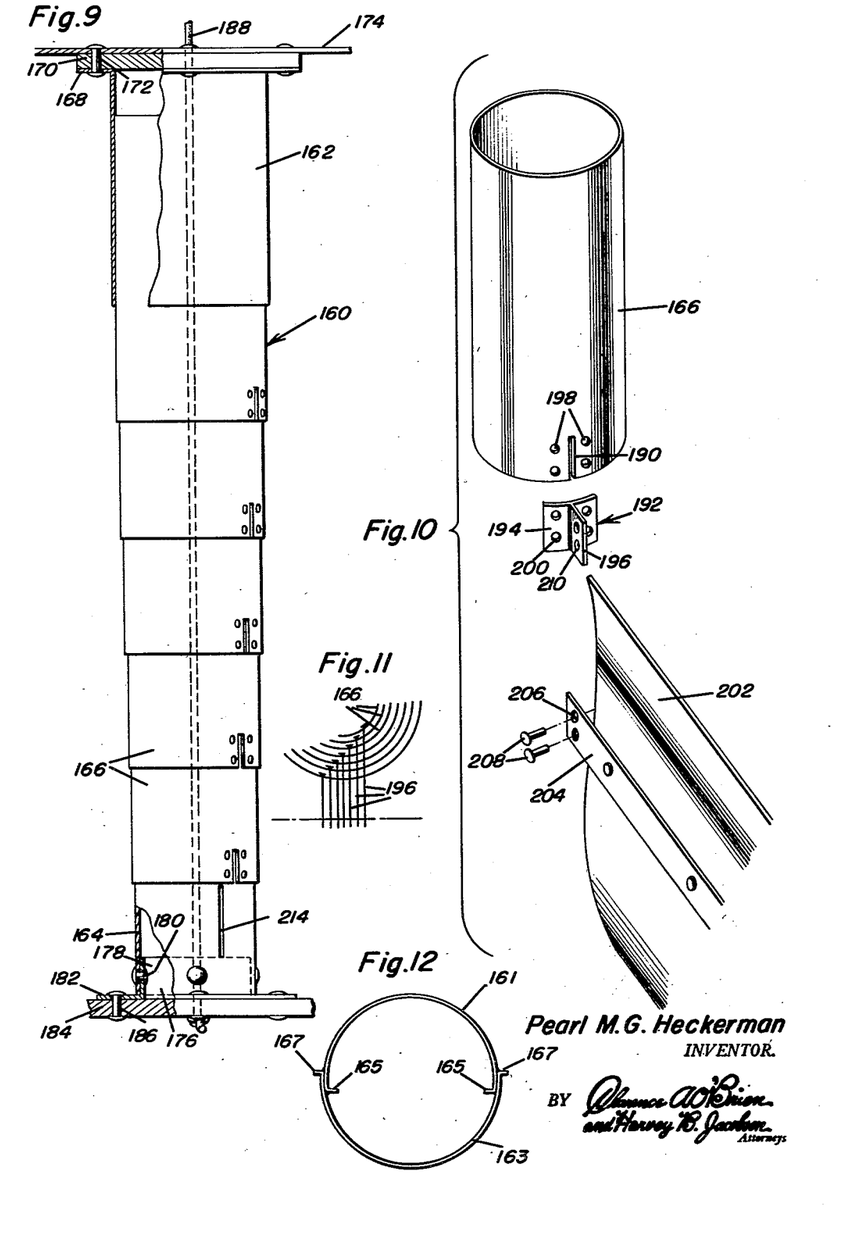
Figure 9 is a view similar to Figure 3, but showing a modified construction of a telescoping support member for any of the previous forms or awnings or closures, parts being broken away and parts shown in vertical section with certain concealed parts being shown in dotted lines therein.
Figure 10 is an assembly perspective view showing a section of the telescoping support member, a mounting bracket and a slat adapted to be secured to the section by the bracket.
Figure 11 is a diagrammatic view of the telescoping support construction of Figure 9 and showing the manner in which the slats are secured to the telescoping sections by mounting brackets.
Figure 12 is a diagrammatic view showing the sectional construction of a sleeve and the manner of assembling two semi-cylindrical sections of a sleeve element of a telescoping rod or brace.

*Modified telescoping support of Figures 9 and 10*

In the embodiments illustrating the principles of this invention in accordance with Figures 1–8, the tubular telescoping supports 34 have consisted of spiral spring members. It is, however, possible to replace that form of telescoping support with a somewhat simpler form, such as the form of support and the means for attaching the slats of the partition thereto which are shown in Figures 9 and 10. It is to be understood that the modified form of telescoping support of Figure 9 and the modified bracket means for attaching the slats to the telescoping support as shown in Figure 10 may be utilized in lieu of the spiral form of support rod shown in Figure 3 in each of the previously described embodiments.

In the modified form of support of Figure 9, it will be seen that the telescoping support, indicated generally by the numeral 160, consists of an inward or base sleeve 162, an outward sleeve 164 disposed at the opposite extremity of the telescoping support, and a plurality of intermediate sleeves 166 of progressively varying diameter.

The inner or base sleeve 162 is provided with an outturned flange 168 and is mounted upon a plate or stiffening disk 170 and is secured, as by rivet or the like 172, to a base member 174 which may comprise the base plate 28 or an equivalent for the same.

The outermost sleeve 164 is received upon the exterior surface of a collar 176 being secured to the cylindrical flange 178 of the same as by a rivet or other fastener 180. The collar 176 has a horizontally disposed annular flange 182 by which the collar and consequently the outer extremity of the telescoping support 160 is secured to a bottom rail or end plate 184, the latter conveniently comprising the previously described bottom rail 38 or an equivalent for the same.

As in the preceding embodiment, a cable 188 is provided, corresponding to the cable 94, which extends through suitable apertures in the base plate 174 and in the member 170, extends through the sections of the telescoping support 160, and through the bottom plate or rail 184.

A compression spring corresponding to the previously described compression spring 92 of Figure 3 may be provided, if desired, or the same may be omitted. It will be noted, however, that the embodiment of Figure 9, constituting as it does a series of slidably associated concentric telescoping sleeves, does not require an additional guide, such as the telescoping guide 70 of Figure 3.

A somewhat different form of mounting bracket is provided for securing the slats of the partition to the telescoping support. Thus, each of the sections, such as the section 166, is provided with a vertical slot 190 at its lower edge and a T-shaped supporting bracket 192 having an arcuate base 194 and a vertically and laterally extending rib 196 is provided. The plate 194 is received upon the internal surface of the sleeve 166 with the rib 196 extending through the slot 190, and registering apertures 198 in the sleeve 166 and on opposite sides of the slot 190 and 200 in the base 194 of the bracket 192 are secured together by suitable fasteners whereby the rib 196 of the bracket will project laterally from the exterior surface of the sleeve. A slat 202 which can be of the same construction as the previously described slats 36, 114 or 134, has a medially positioned strap 204 secured thereto and projecting from the opposite ends thereof, this strap being apertured as at 206 for the reception of rivets or the like 208 which are engageable in corresponding apertures 210 of the rib 196 whereby the slats may be fixedly secured to the brackets. As will be readily appreciated, and will be best apparent from the diagrammatic view of Figure 11, the ribs 196 of the series of brackets are progressively varied in length; and the slots 190 of successive sleeves are progressively circumferentially displaced from each other whereby when the support 160 is collapsed, the brackets may be disposed in side-by-side relation together with the slats 202 carried thereby.

In this form of the invention, it is also proposed, as shown in the diagrammatic view of Figure 12, to form each sleeve of the series of concentric sleeves 162, 164 and 166 of two semi-circular sections 161 and 163 rigidly united to form the complete sleeve. Thus, the inner section 161 has diametrically disposed internally longitudinal flanges 165 and is received with the ends of the outer section 163, the latter having out-turned flanges 167. The sections may be riveted or welded together, and when telescopingly nested, the flanges 165 and 167 of adjacent sections will guidingly and slidingly engage each other thereby preventing relative rotation.

Figure 13:
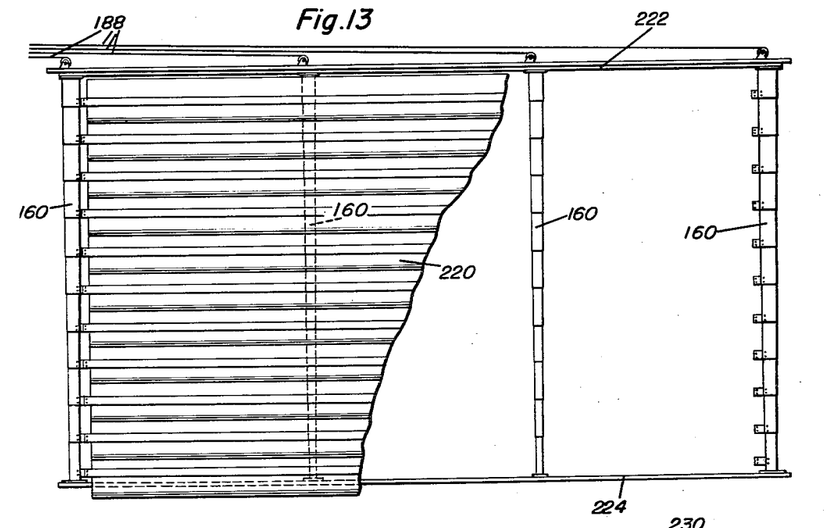
Figure 13 is an elevational view, parts being broken away, of an enlarged awning in accordance with Figure 1 and incorporating therein a plurality of telescoping braces in addition to the telescoping support members.

*Modified construction of an elongated panel having intermediate braces, of Figure 13*

In Figure 13, there is illustrated a somewhat modified construction in which a relatively large partition is provided necessitating the use of a plurality of additional support rods or braces. This panel may be in the form of a window awning, an awning over a doorway, porch or the like. In this form of the invention, the awning member indicated generally by the numeral 220 may correspond to the awning member 10 of Figures 1-4, but preferably utilizes, instead of the telescoping spiral support members 34 of that embodiment, the concentric telescoping support member 160 of Figure 9. Accordingly, it will be seen that at its opposite sides, the awning member 220 is provided with a pair of the telescoping tubular supports 160 of Figure 9, secured to a base plate 222 corresponding to the base plate 28, and to a foot rail 224 corresponding to the previously described foot rail 38. However, intermediate their ends, the base plate 222 and the foot rail 224 have connected therebetween a plurality of the telescoping supports 160. Thus, the relatively long span of the base plate and the foot rail members and the awning member 220 is supported at a plurality of points by the telescoping supports 160. Each of these supports is of course provided with the control cable structure previously described and indicated by the numerals 188. The telescoping supports are preferably of the identical construction set forth in connection with Figures 9 and 10, and a further description of the same appears to be unnecessary.

Figure 14:
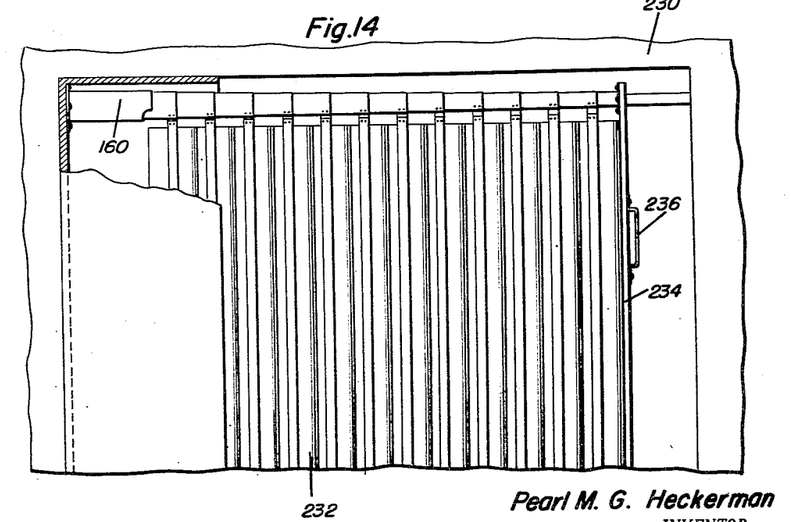
Figure 14 is an elevational view, parts being broken away and shown in section, of a closure member similar to Figure 7 but employing the modified construction of telescoping support member of Figure 9 in lieu of the spiral telescoping construction of Figure 3.

*Modification of Figure 14*

Disclosed in Figure 14 is a modification similar to Figure 7 but showing in place of the tubular support 34 of Figures 1 and 7, the construction of telescoping support 160 of Figure 9. In this construction, there is shown a doorway or other opening 230 and the articulated panel 232 constitutes a closure or a horizontally swinging partition for the same. This panel includes an end member 234 corresponding to the previously described bottom or foot rail 38 of Figure 1 or 184 of Figure 9, this end member being provided with a handle 236 to facilitate horizontal sliding movement of the same. The tubular telescoping support 160 of the construction shown in Figure 9 is mounted horizontally in the doorway opening or construction 230 and the individual slats making up the parts 232 are hung from the sleeves of the telescoping support 160, as illustrated. The operation of this form of the invention will be readily understood from the preceding discussion and description relative to Figure 7 and Figures 9-12.

*Modification of Figures 15-18 comprising a Venetian blind*

Figure 15:
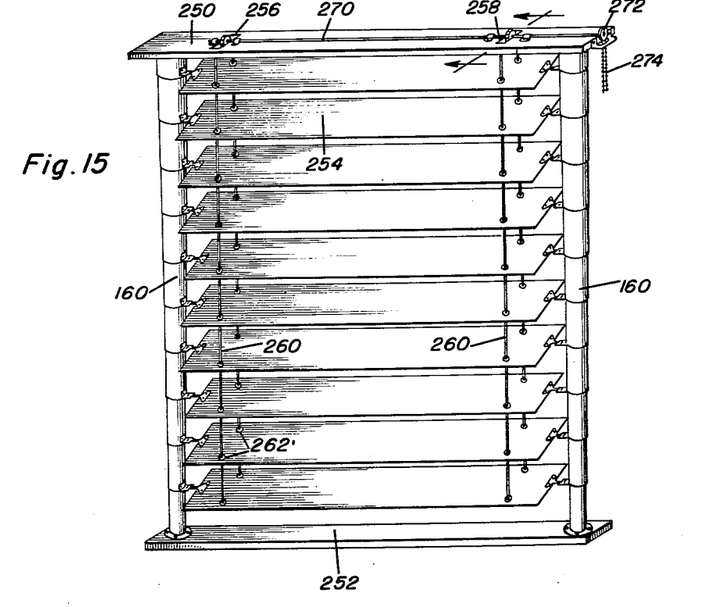
Figure 15 is an elevational view of a Venetian blind type of awning or shutter in which the slats are mounted for pivotal movement.

Illustrated in Figures 15-18 is a Venetian blind type of construction in accordance with the principles of this invention, there being provided a means for connecting the slats to the telescoping supports for pivoting movement in accordance with the actuation of a Venetian blind. Thus, there is provided a top rail 250 and a bottom rail 252 between which and to which are connected the vertically disposed telescoping supports 160 of Figure 9. The slats 254 which make up the Venetian blind are pivotally connected to the supports 160 for vertical movement therewithin the manner to be set forth hereinafter. The head rail 250 is provided with a pair of transversely extending slots 256 and 258, through which extend tilting cords 260. As shown in Figure 15, the two cords 260 extend through pairs of apertures 262 in each of the slats 254, and are provided with knots or other projections or other fastening means engaging the slats whereby tilting of the cords will result in tilting of the slats.

Figure 16:
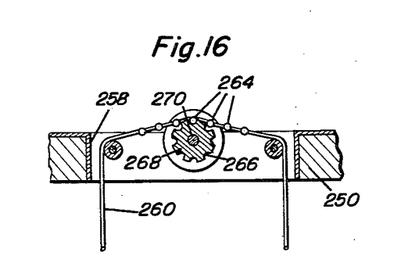
Figure 16 is a vertical transverse sectional detail view taken substantially upon the plane indicated by the section line 16—16 of Figure 15 and showing the means for tilting the slats.
Figure 18:
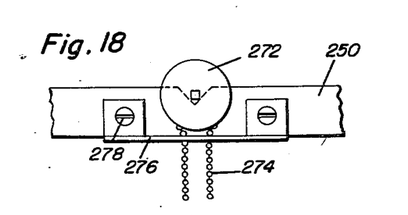
Figure 18 is an end detail view of a portion of Figure 15 showing the manner in which the head or tilting rail of the awning or shutter is manipulated.

As shown in Figure 16, each of the cords at its upper end is provided with a plurality of beads or other projections 264 which engage in notches or recesses 266 in tilting wheels 268 provided upon a horizontally disposed tilting shaft 270 journaled upon the top of the head rail 250. One end of this shaft extends beyond the end of the head rail, as shown at the right end of Figure 15 and as shown in Figure 18, being provided with a pulley 272 about which is entrained a pull cord 274 whereby the tilting shaft 270 may be oscillated. The pull cord 274 preferably extends through a guide bracket 276 secured to the end of the head rail, as by screws 278. It will thus be apparent that when the pull cord 274 is oscillated or rotated, a corresponding rotation will take place for the tilting rod 270, which in turn will actuate the tilting cords 260 to thus tilt the slats 254 of the Venetian blind.

Figure 17:
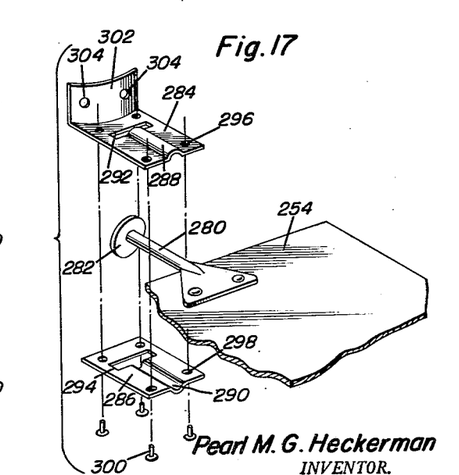
Figure 17 is an exploded perspective view showing the manner in which the slats are pivotally and tiltably mounted by brackets upon the telescoping support means of the awning or shutter.

The means whereby the slats are pivoted to and carried by the telescoping supports 160 are shown in Figure 17. At each end, each slat 254 has a pintle 280 having an enlarged annular head 282. A two-piece bracket construction is provided to journal this pintle and to provide a mounting for the same upon the plurality of cylindrical sections of the telescoping support 160. This two-piece bracket comprises upper and lower plates 284 and 286, having complementary semi-cylindrical depressions 288 and 290 to journal the pintle 280 therebetween; and having transverse complementary registering slots 292 and 294 which receive and retain the heads 282 of the pintles. A plurality of registering apertures 296 and 298 in the upper and lower bracket sections receive fasteners such as rivets 300 whereby the bracket sections may be clamped together and retain the pintles therebetween. The upper section is provided with an arcuate flange 302 which is apertured, as at 304, for the reception of suitable fasteners whereby the brackets and the slats pivoted thereon may be secured to the various sections of the telescoping support 160.

It will thus be apparent that the slats are mounted upon the telescoping supports whereby they may be raised or lowered by the supports in accordance with the support collapsing means 188 of Figure 9 or 94 of Figure 3; and whereby the slats may be at all times capable of pivoting or tilting movement by means of the pull cord 274, as above set forth.

From the foregoing, the construction and operation of the device will be readily understood and further explanation is believed to be unnecessary. However, since numerous modifications and changes will readily occur to those skilled in the art, it is not desired to limit the invention to the exact constructon shown and described, and accordingly, all suitable modifications and equivalents may be resorted to, falling within the scope of the appended claims.

What is claimed as new is as follows:

1. A collapsible ventilated awning comprising a base plate, a pair of telescoping supports each having one end secured to said base plate, each support comprising a spiral tubular member whose convolutions define a plurality of telescoping, longitudinally slidable rigidly interconnected sections, brackets secured to said sections and extendng laterally therefrom, slats having their opposite ends secured to brackets on different supports, said slats being disposed in spaced parallel relation whereby said slats may be collapsed beneath each other when said supports are collapsed and may be expanded into overlapping relation when said supports are expanded.

2. A collapsible ventilated awning comprising a base plate, a pair of telescoping supports each having one end secured to said base plate, each support comprising a resilient tubular spiral having convolutions, brackets secured to said convolutions, a telescoping guide within each of said supports and secured to sad base plate, slats having their opposite ends secured to brackets on different supports, said slats being disposed in spaced parallel relation whereby said slats may be collapsed beneath each other when said supports are collapsed and may be expanded into overlapping relation when said supports are expanded.

3. The combination of claim 1 including a chain extending loosely through said brackets and secured to said base plate and said supports to limit expansion of the latter.

4. The combination of claim 2 including a chain extending loosely through said brackets and secured to said base plate and said supports to limit expansion of the latter.

5. In a collapsible panel, a pair of telescoping cylindrical supports, means for mounting one end of each support upon a base, each support comprising a plurality of telescoping, longitudinally extensible unitary sections which are integrally connected and are resiliently biased into an extended position, slats disposed in spaced parallel relation and secured to and extending between the sections of different supports whereby said slats may be collapsed beneath each other when said supports are collapsed and may be expanded with overlapping relation when said supports are expanded.

6. The combination of claim 5 including a guide rod extending through said sections.

7. The combination of claim 5 including a guide rod extending through said sections, an expansion spring surrounding said rod and disposed in said sections.

8. The combination of claim 5 wherein said pair of telescoping supports are positioned vertically within a window opening and said slats are positioned horizontally in said window opening.

9. The combination of claim 5 wherein said pair of telescoping supports are disposed in vertically spaced horizontal positions extending across an opening and said slats are disposed vertically in said opening.

References Cited in the file of this patent
UNITED STATES PATENTS
1,796,564    Firguson _______________ Mar. 17, 1931